April 16, 1968 B. A. KAUFMAN ET AL 3,378,822

MAGNETIC THIN FILM MEMORY HAVING BIPOLAR DIGIT CURRENTS

Filed March 12, 1963 4 Sheets-Sheet 1

Inventors:
Bruce A. Kaufman
Eduardo T. Ulzurrun

By Louis A. Kline
John T. Matlago
Richard V. Lerque
Their Attorneys.

April 16, 1968 B. A. KAUFMAN ETAL 3,378,822

MAGNETIC THIN FILM MEMORY HAVING BIPOLAR DIGIT CURRENTS

Filed March 12, 1963 4 Sheets-Sheet 2

Inventors:
Bruce A. Kaufman
Eduardo T. Ulzurrun

By [signatures]
Their Attorneys.

Inventors:
Bruce A. Kaufman
Eduardo T. Ulzurrun
By [signatures]
Their Attorneys.

MAGNETIC THIN FILM MEMORY HAVING BIPOLAR DIGIT CURRENTS

Filed March 12, 1963 4 Sheets-Sheet 4

Inventors:
Bruce A. Kaufman
Eduardo T. Ulzurrun

By

Their Attorneys.

3,378,822

MAGNETIC THIN FILM MEMORY HAVING BIPOLAR DIGIT CURRENTS

Bruce A. Kaufman, Los Angeles, and Eduardo T. Ulzurrun, Hollywood, Calif., assignors to The National Cash Register Company, Dayton, Ohio, a corporation of Maryland Filed Mar. 12, 1963, Ser. No. 264,532
17 Claims. (Cl. 340—174)

ABSTRACT OF THE DISCLOSURE

A magnetic memory including a three dimensional coordinate array of anisotropic magnetic thin film storage elements formed on conductors wherein individual digit storage positions comprise a portion of the magnetic thin film and a solenoidal winding. A pulse source providing unipolar current pulses is connected selectively to the solenoidal windings of any desired word for producing a unidirectional magnetic field transverse to the circumferential easy axis of the magnetic thin film in order to read-out the digits stored at the digit storage positions. A bipolar digit current pulse source for each digit position is connected to respective groups of storage elements to produce alternating first and second magnetic fields circumferentially along the easy axis of the magnetic thin film. In order to write-in digits at the digit storage positions of any desired word, concurrent transverse magnetic fields are produced at respective ones of the digit storage positions by selectively producing said unidirectional magnetic fields and individually producing said alternating magnetic fields at each of the digit storage positions of the desired word. Coincidence of the unidirectional magnetic field and each of the alternating magnetic fields determines the direction of the remanent state of the magnetic thin film at the respective digit positions of the desired word.

The present invention is directed to information handling systems and, more particularly, to thin film magnetic memory arrangements for storage and retrieval of information.

The increasing use and demand for computer systems have intensified the research and development efforts to improve present systems and, more particularly, to find new applications utilizing various physical phenomena and effects for digital computing systems. Electrical circuits utilizing parametrical oscillations to represent digital information is one of the developments resulting from these intensified research efforts. Recent developments of new reactive components and, more particularly, non-linear reactive components such as magnetic thin films, provide an increased incentive to explore possible applications for the phenomena of non-linear resonance. In a prior copending application having a common assignee and entitled "Parametrical Device and Apparatus," Ser. No. 43,801, filed July 19, 1960, by Bruce A. Kaufman, a new non-linear inductive element is utilized in novel electrical circuits for producing parametrical oscillations to represent digital information. These electrical circuits and others for producing periodic parametrical oscillations, are referred to herein simply as parametric elements. A parametric element, therefore, is a resonant circuit in which a reactive element is made to vary periodically at a rate ($2f$) by an exciting signal which is an integral multiple of the natural resonant frequency ($f$) of the resonant circuit in order to produce parametric oscillation at a subharmonic frequency of the exciting signal. The periodic variation in the reactive element is provided by supplying the exciting signal having a frequency ($2f$)

from a source often referred to as a "pump." In the parametric element, the parametric oscillation at the frequency ($f$) is stable in either of two phases, zero or pi radians, and the phase of oscillation is utilized to represent the binary digits "0" and "1." For example, when parametric elements in a logical system are oscillating in the phase zero radian, a "0" binary digit is represented; and when oscillations are in the phase pi radians, a binary digit "1" is represented. Thus, the operation of the parametric element as a logical element is based on the spontaneous generation of the subharmonic oscillation which is self-starting in a resonant circuit. Since the subharmonic oscillation may occur in a parametric element at either of its two phases, zero or pi radians, the control of the phase is provided by the phase of a control signal having a phase of zero or pi radians and a frequency ($f$). This control signal is very small in amplitude in comparison to the exciting signal and is often referred to as a "seed" signal. According to the cited example, a control signal of zero phase is coupled into the resonant circuit of the parametric element to produce subharmonic oscillations at the zero phase to represent the binary digit "0," and a control signal having a phase of pi radians is coupled into the resonant circuit of the parametric element to produce oscillations having a phase of pi radians to represent the binary digit "1."

Once the oscillation of a parametric element is established in the phase of either zero or pi radians, the phase of oscillation cannot be changed without removing the exciting signal ($2f$) since a control voltage applied to the resonant circuit of a different phase will not affect the phase of subharmonic oscillation at the frequency ($f$) unless the control signal is greater in amplitude than the exciting signal. In the parametric element, therefore, the exciting signal having a frequency of ($2f$) is made discontinuous by modulation of the exciting signal by a periodic square wave which periodically switches the exciting signal on and off.

Synchronization for many parametric elements included in a parametrical logical system is provided by a logical clock source supplying a square wave at a desired clock rate. In response thereto, three subclock square waves are produced which modulate the exicting signal and produce three separate exciting signal source output signals, namely, I, II and III, during each operating cycle of the logical system. Accordingly, each operating cycle of a parametrical logical system is charcterized by three exciting signal outputs which are referred to hereinafter as subclock signals and are designated subclocks I, II and III.

Having discussed the basic digital operations provided by parametric elements, the dual frequency memory arrangement of the present invention will be briefly described. While the dual frequency memory arrangement of the present invention is particularly suitable for use with parametrical logical systems to provide a high speed electronic computer system, it should be made clear that the invention is suitable for other logical systems in which binary states are indicated by two different levels of voltage or current amplitudes, for example. It also should be noted that the operation of the dual frequency memory itself does not operate in the same manner as a parametric element but does operate in a very advantageous manner with logical systems employing parametric elements due to the fact that the inputs and outputs of the dual frequency memory are directly usable in parametrical logical systems. That is, the phase of the input and output signals of the present memory arrangement determines the binary digit "0" or "1'" and there is no need to provide phase to D.C. converters for the inputs and D.C. to phase converters for the outputs to convert the respective input and output signals of the memory for parametric elements of a system. Such conversion would be required when the memory arrangement of the present invention is used with logical systems employing high and low levels of voltages or currents to represent the binary states. Accordingly, it is a principal object of the present invention to provide a novel dual frequency thin film magnetic memory arrangement including novel circuit arrangements for storage and retrieval of information primarily for use with parametrical logical systems and also with conventional high and low level voltage or current logical systems for performing logical operations.

In the previous discussion, it was noted that the present invention is directed to a dual frequency thin film magnetic memory arrangement. Computer systems or information handling systems, in most instances, include a fast access memory for storing binary information to be utilized in the logical operations for processing information. The information to be processed must be readily accessible to provide for high speed operation of the computer systems. It is well known in the information handling and data processing art, that magnetic memories, usually in the form of coordinate array matrices, have made extensive use of toroidal magnetic cores as magnetic memory elements for fast access memories. In general, the logical operations are performed at faster rates than the information to be logically operated upon can be accessed from the magnetic memory, and therefore, a higher speed magnetic memory element and memory arrangement is desired. The thin film magnetic memory element provides for higher speed operation than the magnetic cores since the thin film is capable of higher switching speeds for storing the binary digital states. The cylindrical thin film provides advantages over the flat thin film and one of these advantages is that it is readily adaptable into coordinate memory arrays. The cylindrical thin magnetic film is deposited on a conductor substrate to provide a continuous cylindrical thin film of magnetic material and preferably on a beryllium-copper conductor substrate. This magnetic element is referred to herein as a magnetic rod. The cylindrical structure of the magnetic rod permits the use of multiple turn windings at each of individual binary digit or bit positions and a single magnetic rod provides for many of such digit positions as compared to a core which provides for only one digit storage position. In the preferred memory arrangement of the present invention, a group of four magnetic rods are serially interconnected in a digit plane, and a plurality of separate digit planes in a three-dimensional coordinate array provides for storage and retrieval of a word comprising a plurality of digits. Selection of a plurality of digit positions forming a word for reading or writing operations is provided by selection of a set of coordinates of the array wherein each set of coordinates selects a plurality of serially connected solenoid windings coupled to a plurality of magnetic rods in different digit planes and disposed in a word plane.

In the preferred arrangement of the present invention a magnetic rod provides advantages in that each rod conductor thereof can be used both as a drive line and a sense line. During periods of writing, the rod conductor is used as a drive line and during the periods of reading the rod conductor is used as a sense line. Therefore the present invention, in addition to eliminating the need for the additional solenoid windings for sensing during read periods, also eliminates the delay in inductance of long solenoid winding sense lines which produces serious limitations in speed in large size memories.

Further, in accordance with the preferred embodiment, two separate successive series of unipolar pulses or unipolar pulse trains are provided for a memory read operating cycle which includes both read and restore operations. The restore operation in a read operating cycle follows the read operation to restore the magnetization states of the digit positions after readout. The read pulses have a repetition rate of the frequency ($f/2$) and are delayed 90° at the frequency ($f$). The delayed read pulses are then applied to a group of solenoid windings at the digit positions of any single selected word to induce digit sense signals of the word in the rod conductors of the respective digit planes. The read pulses are delayed 90° to compensate for the phase shift of the sense signals produced in the inductive coupling between the solenoid windings and the respective rod conductors. The rod conductors are connected to the inputs of respective memory input-output flip-flops to couple the sense signals thereto for storing the digits of the selected word read from the memory. As noted above, each read operating cycle of the memory includes a restore operation which comprises a complete write operation in that the word read from the memory is written back into the selected word position. A write operation is a dual frequency operation and provides for both a series of write unipolar pulses and write A.C. digit currents to be applied to the digit positions of a selected word in a word plane. A word plane is defined as one or more magnetic thin film elements that are coupled or intercoupled to store a word. A digit plane is defined as one or more thin film elements coupled or intercoupled to supply sense signals during read operations and receive an A.C. current with phase information during writing operations. During the write operation, the A.C. digit currents are supplied from the respective memory input-output register flip-flops to the magnetic rod conductors of the digit planes and the write unipolar pulse train is supplied to the solenoid windings at the digit positions of any single selected word.

In the preferred embodiment of the present invention, the unipolar pulses are shaped to be narrow and of short time duration relative to the time duration of one-half cycle of the A.C. digit currents. The shaped unipolar pulse provides definite advantages over prior arrangements in that the unipolar pulses increase the speed of response and avoid switching of magnetization states at digit positions and minimize or eliminate "creeping" of the magnetization during read operations.

Accordingly, it is an object of the present invention to provide a memory arrangement having the foregoing features and advantages which provides for higher speed operation and prevents undesired switching of magnetization states of digit positions in a memory during readout and minimizes or eliminates "creeping" of magnetization during readout.

Another object of the present invention is to provide an improved magnetic thin film memory for fast access and storage of information.

A further object of the present invention is to provide a dual frequency memory in which unipolar pulses produce a unidirectional magnetic field, an A.C. signal produces an A.C. magnetic field and the unidirectional and A.C. magnetic fields are combined for writing information into a magnetic thin film.

Still another object of the present invention is to provide narrow unipolar pulses to control the magnetic field applied to a magnetic thin film.

A further object of the present invention is to provide a combination of narrow write unipolar pulses and write A.C. current to accurately control the switching of the magnetic thin film.

Another object of the present invention is to provide a dual frequency memory in which a simple coordinate selection circuit is capable of addressing any word in the memory.

A further object of the present invention is to provide unipolar pulses for accessing information from a magnetic memory and the combination of simultaneous unipolar pulses and A.C. currents to produce combined magnetic fields for switching the magnetization state of an anisotropic magnetic thin film for storing information in a magnetic memory.

A still further object of the present invention is to provide unipolar pulses for dual frequency mode of operation for a magnetic memory to simplify the memory matrix therefor.

Still another object of the present invention is to provide an improved magnetic rod memory having one or more of the aforementioned features and advantages.

Other objects and features of the present invention will become apparent to those skilled in the art as the disclosure is made in the following detailed description of a preferred embodiment of the present invention as illustrated in the accompanying sheets of drawings, in which:

FIG. 1 is a schematic diagram, partly in block diagram, for illustrating the preferred embodiment of the dual frequency magnetic rod memory arrangement of the present invention;

FIG. 2*a* is a perspective view of a portion of a typical magnetic rod which rod has been greatly enlarged and shown in section to disclose its structure according to the preferred embodiment of the present invention;

FIG. 2*b* is a characteristic curve illustrating the open hysteresis loop of the typical magnetic rod of FIG. 2*a* along the circumferential easy axis of remanent magnetization;

FIG. 2*c* is similar to FIG. 2*b* and shows the closed hysteresis loop of a typical magnetic rod of FIG. 2*a* along the longitudinal hard axis of magnetization.

FIG. 3*a* shows the portion of the typical magnetic rod shown in FIG. 2*a* with the addition of a solenoid winding to illustrate a typical digit storage position in the memory arrangement of the preferred embodiment of the present invention;

FIG. 3*b* is a diagram showing a critical curve for illustrating the switching characteristics of the magnetic rod structure shown in FIG. 3*a*;

FIG. 3*c* is an abstract diagram showing the critical curve similar to that shown in FIG. 3*b* and a modified Lissajous curve of the combined magnetic fields which are applied to the magnetic rod structure shown in FIG. 3*a* for wiring "0" binary digit in the digit storage position;

FIG. 3*d* is another diagram showing the curves similar to those illustrated in FIG. 3*c* for writing a "1" binary digit in the digit storage position;

FIG. 4*a* is a diagram of magnetization at the typical digit position illustrating applied magnetic fields and resulting changes in magnetization of the portion of the magnetic rod shown in FIG. 3*a* during readout of a "0" binary digit from the digit position;

FIG. 4*b* is a diagram similar to FIG. 4*a* to illustrate readout of a "1" binary digit from the digit position;

*General description of the memory (FIG. 1)*

Figure 1:
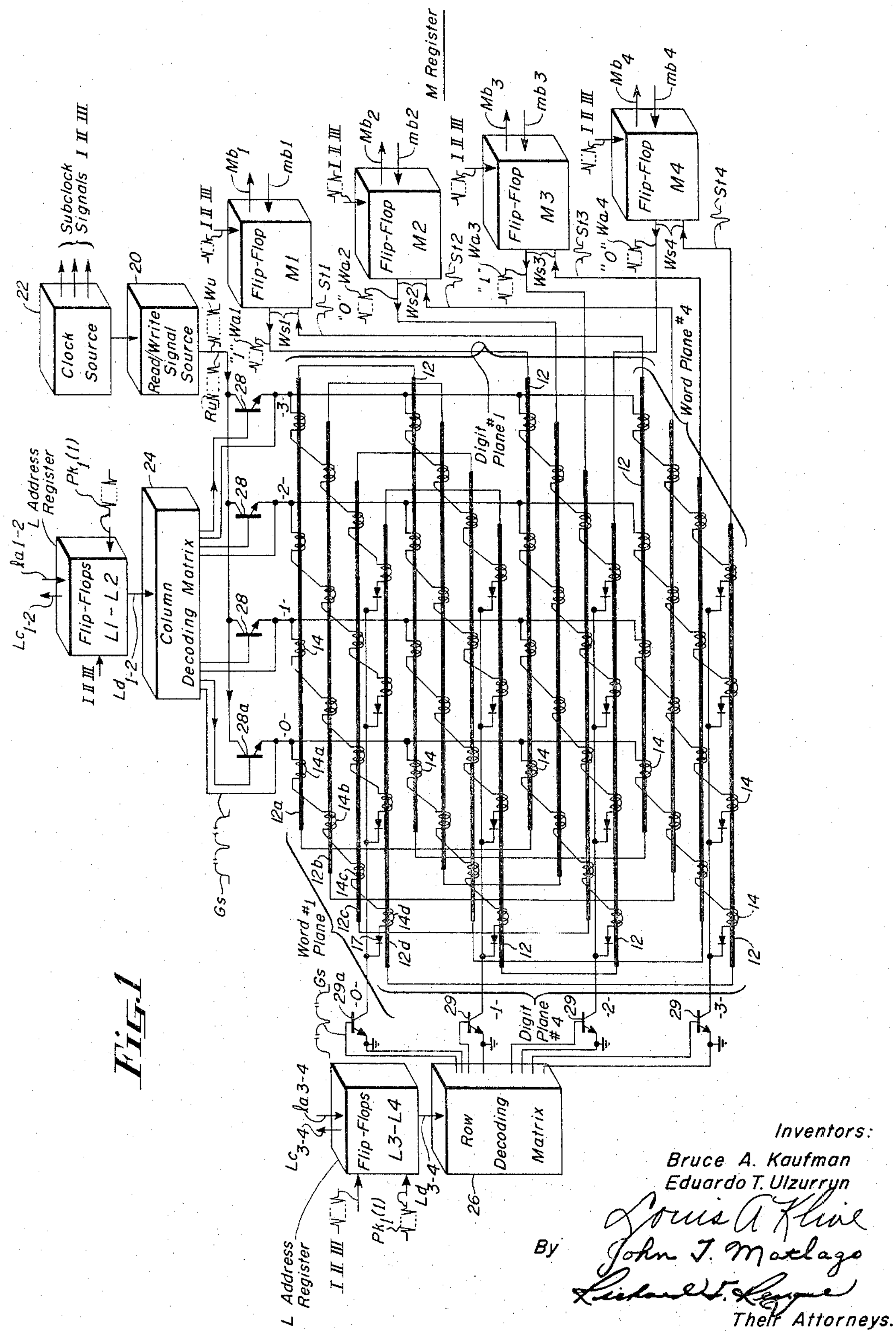

Referring now to the drawings, the preferred embodiment of the present invention is shown in FIG. 1 and comprises a dual frequency memory arrangement including an array of sixteen magnetic rods 12 and four multiturn solenoid windings 14 wound on each of these magnetic rods. As shown, the magnetic rods 12 are arranged in a three-dimensional array to provide four (horizontal) word planes #1–#4 and four (vertical) digit planes #1–#4. The four magnetic rods 12 in each of the vertical digit planes #1–#4 are interconnected to provide a combined write and sense signal current path for storage and retrieval of binary digits "1" and "0" in sixteen digit storage positions of each digit plane. In a horizontal word plane, e.g., word plane #1, the magnetic rods 12*a*, 12*b*, 12*c* and 12*d* are intercoupled by four groups of serially interconnected solenoid windings 14, e.g., windings 14*a* to 14*d*. Each solenoid winding 14 and each corresponding portion of the magnetic rod 12 comprise a digit position in the memory and each group of four serially interconnected solenoid windings 14 and each of the corresponding portions of the magnetic rods 12 comprise a word position, e.g., word position 0–0 includes windings 14*a* to 14*d*. Any word position of the sixteen word positions of the memory arrangement shown in FIG. 1 is capable of being selected by setting L Address Registers' flip-flops L1–L2 and L3–L4. In an operating cycle of the memory of FIG. 1, any single word position is selected by setting the L Address Registers and applying read and write unipolar pulse trains R*u* and W*u* from read/write signal source 20 to the four serially interconnected solenoid windings 14 of the selected word position, e.g., selection of word lines –0– and –0– in a memory operating cycle applies read and/or write unipolar pulses R*u* and W*u* to solenoid windings 14*a*, 14*b*, 14*c* and 14*d* at word position 0–0. In a read operating cycle, for example, the four binary digits "1010" stored at digit positions of the selected word position 0–0 are read out into respective flip-flops M1 to M4 comprising the memory input-output M register. The operation of the memory arrangement is described in detail in subsequent related portions of the present disclosure.

*Detailed description of the memory (FIG. 1)*

Figures 8, 9, 10:
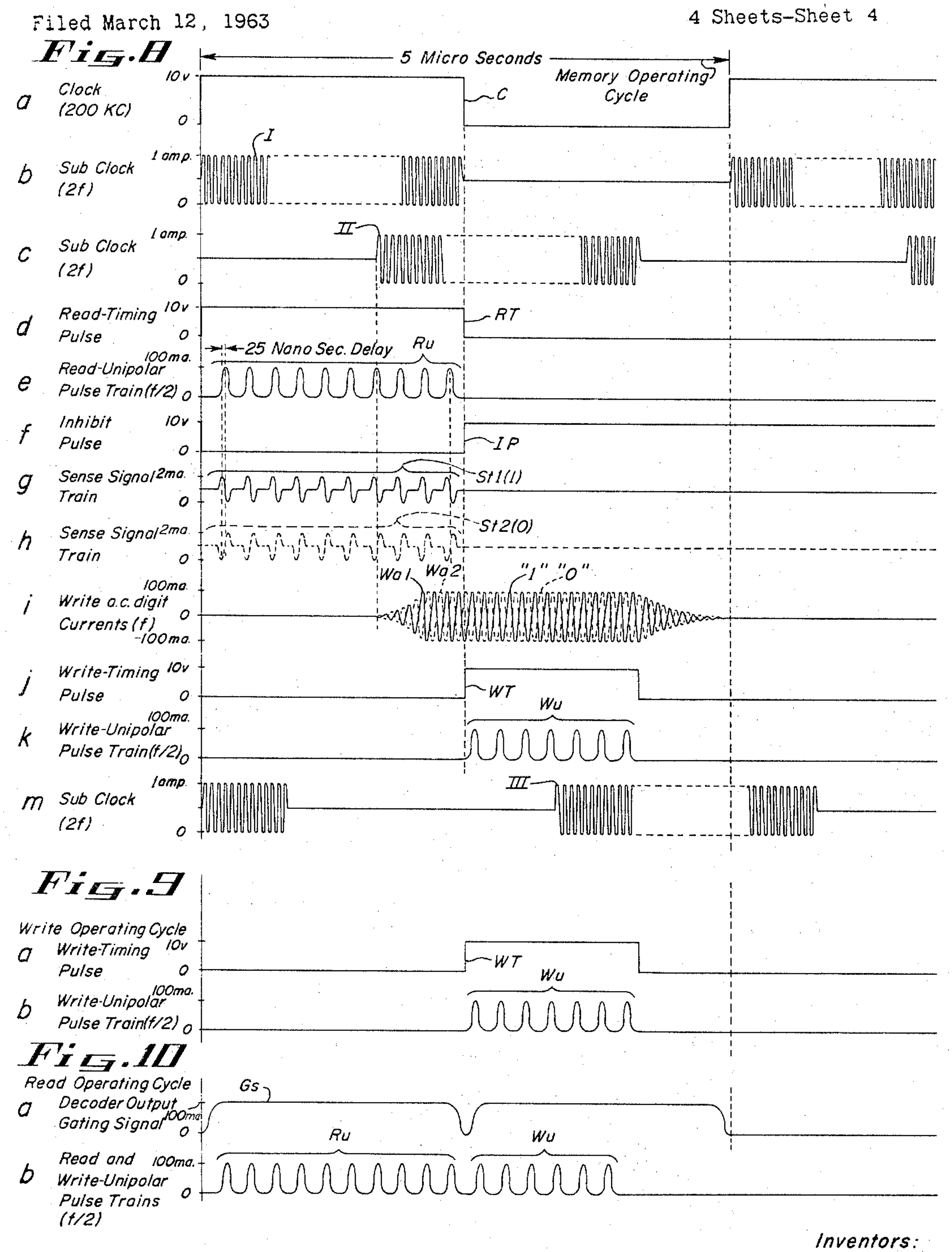
FIG. 8 is a diagram showing typical signal waveforms produced by the preferred memory arrangement during a read operating cycle.
FIG. 9 is a diagram showing selected typical signal waveforms produced by the preferred memory arrangement of FIG. 1 during a write operating cycle.
FIG. 10 is a diagram showing typical signal waveforms produced by the decoding matrices to pass the trains of read and write unipolar pulses to the solenoid windings of an addressed word of the preferred memory arrangement shown in FIG. 1.

The preferred dual frequency memory arrangement shown in FIG. 1 is synchronized by a clock source 22 generating clock pulses C at, for example, a 200 kilocycle clock rate. Typical signal waveforms for synchronous operation are shown in FIG. 8 which shows the clock pulses C (FIG. 8*a*) that are generated to provide synchronous operation at the 200 kilocycle rate. At this clock rate, an operating cycle has a time period of five microseconds. The clock source 22 is not intended necessarily to be restricted in its use to the memory but is capable of providing clock pulses C and subclock signals I, II and III to an entire parametric computer system of which the present invention provides a fast access memory for storage and retrieval of information for use in computing. The clock source 22 comprises a sinusoidal signal wave generator producing a twenty megacycle signal (2*f*) which is modulated to produce twenty megacycle (2*f*) subclock signals I, II, and III illustrated in FIGS. 8*b*, 8*c* and 8*m*, for example, in a manner disclosed in the cited copending application. The subclock signals I, II and III are supplied to the flip-flops L1 to L4 of the L Registers and flip-flops M1 to M4 of the M Register shown in FIG. 1 and, in addition, an unmodulated twenty megacycle (2*f*) signal is supplied to the read/write signal source 20 to generate the read and write unipolar pulse trains R*u* and W*u* in a manner to be disclosed in detail later in the description of FIG. 5.

Proceeding with the description of FIG. 1 and passing over until later the details of the manner in which the read and write pulse trains R*u* and W*u* are generated, these read and/or write pulse trains are coupled to the group of four serially connected solenoid windings 14 at any one addressed word position (e.g., word position 0–0) by coordinate selection of a current path therethrough. During each memory operating cycle in which the read unipolar pulse train R*u* (FIG. 8*e*) is coupled to a selected word position, a sense signal train (e.g., S*t*1(1) as shown in FIG. 8*g*) is induced in the magnetic rods 12 at each digit position of the selected word. Since the digit positions of any selected word are in separate digit planes #1–#4, sense signal trains S*t*1 to S*t*4 (FIG. 1) are coupled to combined sense inputs and write outputs WS1 to WS4 (FIG. 1) respectively to store the binary digits (for example, "1010") in the flip-flops M1 to M4, respectively.

Each read operating cycle of the memory of FIG. 1 includes a read operation and a subsequent write (restore) operation in the same cycle. In the preferred arrangement, the selection of any word position (e.g., word position 0–0) is retained throughout the memory operating cycle so that the write unipolar pulse train W*u*, which is generated each read operating cycle, is applied to the solenoid windings 14 of the selected word position (e.g., word position 0–0) to write back the binary digits (e.g., "1010") read out during the read operation of the same memory cycle. In addition to the write unipolar pulse train W*u* provided for each write operation, write A.C. digit currents W*a*1 to W*a*4 are supplied to the magnetic rods 12 in the respective digit planes #1–#4 to write the binary digits into the respective digit position. The write A.C. digit currents W*a*1 to W*a*4 are supplied for each write operation by the flip-flops M1 to M4 only during the time period of subclock II, e.g., digit current W*a*1 as shown in FIG. 8*i*. The combination of a write unipolar pulse train W*u* and write A.C. digit currents W*a*1 to W*a*4 at an addressed word position causes the binary digits to be restored in the respective digit positions in the addressed word position from which the digits were accessed.

A write operating cycle comprises a write operation only and does not include a read operation. The write operation is similar to the write (restore) operation, described supra, except that the binary digits being stored have not been read out of the memory in the write operating cycle being considered but are any binary digits which are stored in the flip-flops M1 to M4 during the time period of the write operation, i.e., during the time period of the subclock II in the write operating cycle.

From the foregoing, it is clear that the binary digits stored in flip-flops M1 to M4 are written into the respective digit positions of any addressed word posiiton selected during a memory operating cycle whether the memory operating cycle is a read or a write operating cycle. During a read operating cycle, the binary digits read out of the memory into flip-flops M1 to M4 are written back at the same address in order to be restored to the respective digit positions of the word position selected for the memory operating cycle.

As shown in FIG. 1, address and selection circuitry is provided for selection of any word position for read and write operating cycles. This circuitry includes the L Address Registers which are shown to comprise the flip-flops L1–L2 and L3–L4. The setting of these flip-flops determines the word position and the group of four solenoid windings 14 which are selected for passing read and write unipolar pulses for read and write operations. This selection is accomplished by applying phase to D.C. converted outputs of L Address Registers ($Ld_{1-2}$ and $Ld_{3-4}$) to the column decoding matrix 24 and row decoding matrix 26, respectively. From the detailed description of FIG. 7, infra, it will be seen that the decoding matrices are diode matrices having pulse forming circuits in the outputs thereof to produce gating signals G*s*

(FIG. 10*a*) for passing the read and write unipolar pulse trains R*u* and W*u*. The gating signals G*s* that are supplied from the column decoding matrix 24 are applied to any selected one of the column (NPN) transistors 28; and the gating signals G*s* that are supplied from the row decoding matrix 26 are applied to any selected one of the row (NPN) transistors 29 to provide a single selected current path through the group of four solenoid windings 14 of any selected word position. For example, gating signal G*s* applied to the base of the column transistor 28*a* and to the emitter of the row transistor 29*a* pass read and write pulse trains R*u* and W*u* through solenoid windings 14*a* to 14*d* at the word position 0–0 during a read operating cycle and pass write pulse train W*u* during a write operating cycle. In operation, the passing of a read pulse train R*u* through solenoid windings 14*a* to 14*d* at word position 0–0, for example, produces sense signal trains S*t*1 to S*t*4 at the inputs W*s*1 to W*s*4 during readout, to store the binary digits "1," "0," "1" and "0," as shown, for example, in flip-flops M1 to M4, respectively. In passing, it should be noted that the row transistors 29 are shown having their emitters connected to ground. While this circuit arrangement lends itself to clarity in discussion, it is often desirable to return the emitter to the output of the read/write signal source 20, e.g., to the return side of an output transformer (not shown) of an amplifier 44 (FIG. 5) whereby a "floating" signal level is provided instead of a ground reference level as shown in FIG. 1. Also to be noted is that decoding matrices 24 and 26 employ diode logical circuitry rather than parametrical logical circuitry because the parametrical logical circuitry is slower than the diode logical circuitry used in the present preferred embodiment of the invention. Thus, the delay in accessing a word at any address is minimized.

Referring now more particularly to the circuit arrangement of the digit planes #1–#4, the preferred memory arrangement of the present invention of FIG. 1 has been described as including sixteen magnetic rods 12 comprising rod conductors 16 on which magnetic thin film 18 (FIG. 2*a*) has been deposited. As shown in FIG. 1, certain ones of the magnetic rods 12 are short circuited at their ends. The write A.C. digit currents W*a*1 to W*a*4, having sinusoidal waveforms, are supplied to respective groups of four magnetic rods 12, and a standing wave with a maximum current at the shorted end is maintained throughout, i.e., the ratio of maximum to minimum current is approximately one. Thus, the length of each line, i.e., the total length of either two of the magnetic rods 12 in each group comprising a digit plane, is less than a quarter wavelength of the ten megacycle signal (approximately 7 meters) and the current ratio of I max. to I min., along the total length of magnetic rods 12 in any of the digit planes #1–#4, is maintained near one.

The reason for providing a short circuited line for each digit plane consisting of four rods 12 is that the characteristic impedance of the line is on the order of 300 ohms. If the line is terminated by the characteristic impedance, then the input impedance as seen by the output of power parametric element (e.g., M*b*1 shown in FIG. 6) should be about 300 ohms assuming an ideal (transmission) line. The power required to drive this latter (transmission) line would be large, which in turn, would require expensive drivers and more power output from the power parametric element. As shown in FIG. 1, with the line short circuited, the input impedance is primarily reactive, i.e., inductive with a small resistive component dues to the losses in the (transmission) line.

The provision of a standing wave for a group of four magnetic rods 12 (digit plane) has the advantage of providing a standing wave along the total length which is of the same phase at all points along the total length. The amplitude changes, as indicated before, are well within the tolerances of the system to provide for uniform magnetization at each digit position in any digit plane.

The circuit arrangements of the four magnetic rods 12 in each of the digit planes #1–#4 are different to provide alternate digit planes which are balanced transposed (digit planes #1 and #3) and balanced non-transposed (digit planes #2 and #4) magnetic rod transmission lines. Balanced transposed lines in digit planes (#1 and #3) provide noise cancellation of extraneous signals from external sources which have not been shielded from the memory array. However, because of the close proximity of magnetic rods 12 of adjacent digit planes, the non-transposed arrangement of magnetic rods 12 in alternate digit planes (#2 and #4) minimizes interaction between digit planes #1–#4. By minimizing interaction, the possibility of the ten megacycle (*f*) write A.C. digit current supplied to one digit plane controlling the output of the adjacent digit planes is minimized if and when there is a difference in timing of the digit current supplied to adjacent digit planes. Accordingly, digit plane #4 is a balanced nontransposed transmission line and the next adjacent digit plane #3 is a balanced transposed transmission line and so forth.

*Magnetic rod digit positions (FIGS. 2a to 4b)*

Figure 2A:
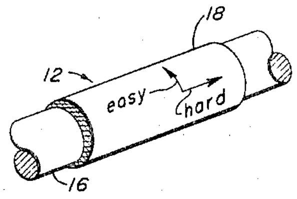
Figure 2B:
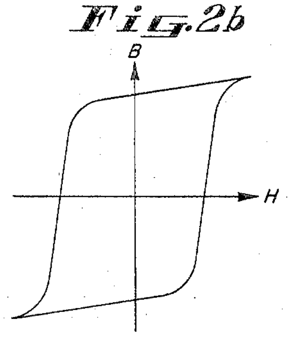
Figure 2C:
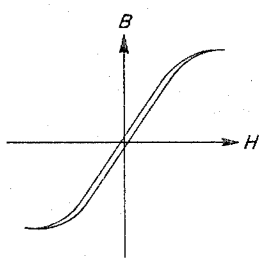

In FIG. 2*a*, a typical section of the preferred magnetic thin film storage device, i.e., the magnetic rod 12*a*, is shown to comprise a cylindrical beryllium-copper substrate or rod conductor 16 of approximately .01 inch in diameter having a Permalloy magnetic thin film 18 of low coercivity comprising a nickel-iron (Ni-Fe) alloy preferably 80% to 82% nickel, 18% to 20% iron and a trace of phosphorous acid which is electrodeposited on the rod conductor 16. The thickness of the magnetic thin film 18 is approximately ten thousand angstroms (10,000 A.) or less. While the magnetic thin film 18 is being deposited on the rod conductor 16, a magnetic field is produced in the area of electrodeposition, the known effect of which is to produce anisotropic properties in the magnetic thin film 18. In the preferred and well known manner therefore, a current is passed through the conductor to produce a magnetic thin film 18 having circumferential remanent magnetization, i.e., anisotropic properties, by a circular magnetic field about the rod conductor 16. As shown in FIG. 2*a*, an easy axis of remanent magnetization is produced longitudinally and in the cylindrical magnetic thin film 18. In FIGS. 2*b* and 2*c*, typical hysteresis loops are shown for the anisotropic cylindrical thin film 18 in which an applied circumferential alternating magnetic field produces the rectangular hysteresis curve shown in FIG. 2*b* and an applied alternating magnetic field in the longitudinal direction produces a substantially closed hysteresis curve shown in FIG. 2*c*.

Figure 3A:
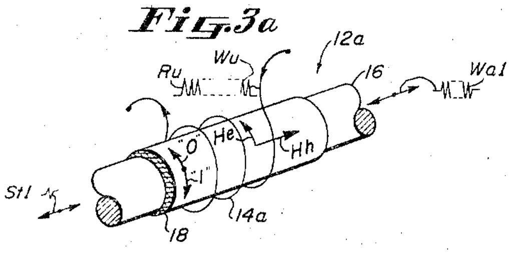

Referring now to FIG. 3*a*, a section of the magnetic rod 12*a* shown in FIG. 2*a* is shown along with the solenoid winding 14*a* which combination comprises a typical digit position of the preferred memory arrangement of FIG. 1. A write operation is capable of changing the binary state at this digit position to store a binary digit "1" or "0" therein by dual frequency signals which are simultaneously applied to the rod conductor 16 and solenoid winding 14*a*. An alternating magnetic field along the easy axis (H*e*) is applied to the rod 12*a* in response to a ten megacycle signal (*f*), e.g., the write A.C. digit current W*a*1 that is applied to the rod conductor 16 as indicated in FIG. 3*a*. A transverse magnetic field is produced along the hard axis (H*h*) by the other one of the dual frequency signals, i.e., the write unipolar pulse train W*u* which is supplied to the solenoid winding 14*a*. The phase of pi radians of the write A.C. digit current W*a*1 and pulse train W*u* will result in remanent magnetization along the easy axis in the direction as shown, to store the binary digit "1" for example. The multi-turn solenoid winding 14*a*, shown schematically as having three turns, is preferably a solenoid winding having ten turns and wound at a rate of approximately seventy-eight turns per centimeter to provide a high concentrated magnetic field intensity in the thin film at the digit position for a given current level. As shown in FIG. 3*a*, either a binary digit "0" or binary digit "1" is stored by respective remanent magnetization states along the easy axis and in the magnetic thin film 18. The resulting remanent magnetization state is determined during any writing period, when a write unipolar pulse train W*u* is applied to the solenoid winding 14*a* and a write A.C. digit current W*a*1 of either the phase zero or pi radians is applied to the rod conductor 16. The manner in which combined alternating and transverse magnetic fields, produced by write A.C. digit current W*a*1 and write unipolar pulse train W*u*, switches the state of remanent magnetization of the magnetic rod 12*a* (along the easy axis H*e*) to store the binary digits "1" and "0" can be understood from the description of critical abstract diagrams including switching curves (astroids) shown in FIGS. 3*b*, 3*c* and 3*d*.

Figure 3B:
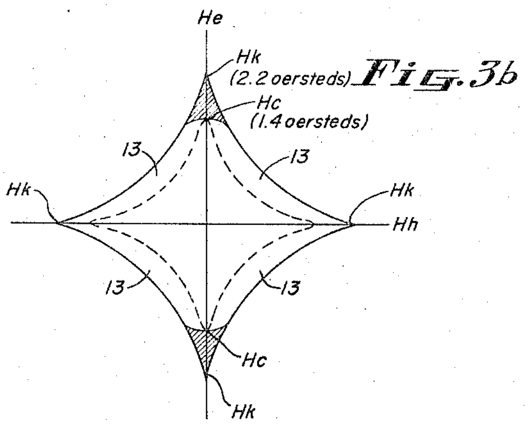

In FIG. 3*b*, the critical curve is shown to form an astroid (solid line). This is an idealized critical curve for domain rotation as is well known, and generally it can be stated that applied magnetic fields which cross the critical curve are capable of producing domain rotation. Also, magnetic fields having a resulting magnitude greater than H*c* which thereby project into the shaded areas are capable of producing switching of the remanent magnetization by domain wall motion. Furthermore, any magnetic field or combination thereof having a magnetizing force crossing the dashed line into a "creeping" zone 13, which is the area between the critical curve and the dashed line, is capable of altering the remanent magnetization state but generally without producing complete switching. While the magnetic rod 12*a* does not necessarily follow the idealized critical curve of FIG. 3*b*, this will serve as a basis for explanation of the reading and writing operations including the switching of the magnetization state of the magnetic rod 12*a* at the digit position shown in FIG. 3*a* since the critical curve of the magnetic rod 12*a* follows this idealized curve as shown with deviations resulting from different modes of operation and composition and structure of the actual thin films on the magnetic rod 12*a*. For example, the coercivity (H*c*) of the magnetic thin film 18 of the magnetic rod 12*a* is approximately 1.4 oersteds and the anisotropy (H*k*) is approximately 2.2 oersteds. In practice, however, the switching of magnetization states has been found to occur as a result of domain wall motion which places point H*k* along the hard axis (H*h*) at approximately 7 oersteds. The memory arrangement is not limited to this particular mode of operation, as will be apparent from the description which follows, and the critical curves shown in FIGS. 3*b* to 3*d* serve to demonstrate the operation wherein switching of magnetization states can occur as a result of domain rotation or domain wall motion and the critical curves will be modified to the characteristics of the particular magnetic thin film and the particular signals used to switch magnetization states of the magnetic thin film. For example, if switching by domain rotation is desired, the rise time of the applied signals is controlled whereby the rise time is of a few nanoseconds duration or less. Also, the composition of the magnetic thin film 18 and the manner in which it is desposited is controlled to provide for switching by domain rotation.

Figure 3C:
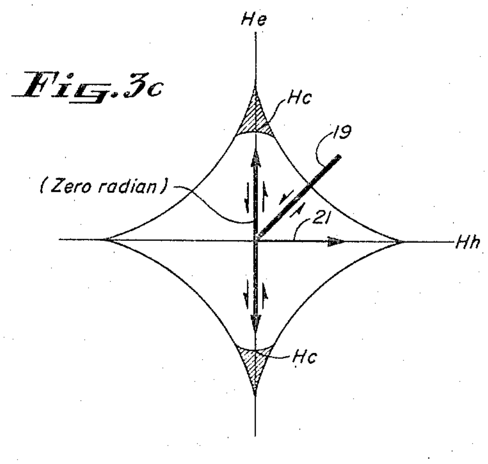
Figure 3D:
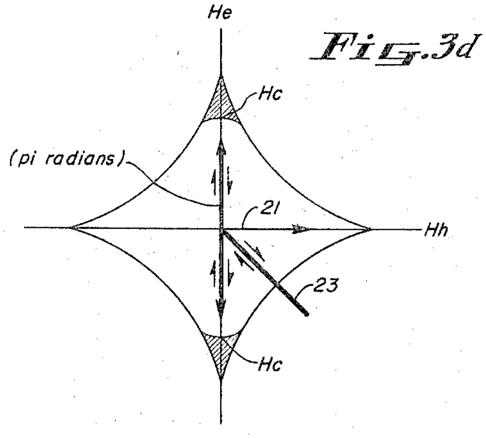

Referring now to FIG. 3*c*, a heavy line 19 describes the locus of points of the different magnitudes of the combined magnetic fields produced in the magnetic thin film 18. These combined magnetic fields result from write unipolar pulse train W*u* and write A.C. digit current W*a*1 of the phase zero radian for writing the binary bit "0" in the digit position shown in FIG. 3*a* for example. In FIG. 3*d*, a typical magnetic field for storing the binary digit "1" is shown by line 23 wherein the phase of the write A.C. digit current W*a*1 (FIG. 3*a*) is pi radians. It should be appreciated that after applied magnetic fields produce a resultant magnetic field crossing the critical curve as shown in FIGS. 3*c* and 3*d*, that the magnetization vector $\overline{M}$ (FIGS. 4*a* and 4*b*) will return to the easy axis (H*e*) of remanent magnetization. Accordingly, the combined applied magnetic fields illustrated in FIG. 3*c* result in magnetization $\overline{M}(0)$ shown in FIG. 4*a* and the combined applied magnetic fields illustrated in FIG. 3*d* result in magnetization M(1) shown in FIG. 4*b*. Thus, the binary states "0" and "1" are stored by the simultaneous application of dual magnetic fields to the cylindrical thin film 18 of the magnetic rod 12*a* wherein an alternating magnetic field is applied along the easy axis (H*e*) and a unidirectional magnetic field is applied along the hard axis (H*h*) and at the digit position; and the combination of fields produces the combined magnetic fields. Depending upon the phase (zero or pi radians) the direction and magnitude of the combined magnetic fields is either along the line 19 or along the line 23 (FIGS. 3*c* and 3*d*). Since the magnitude of the combined fields exceeds the switching threshold of the magnetic thin film 18, i.e., crosses the critical curve, the direction of remanent magnetization along the easy axis (H*e*) is determined by which side of the hard axis (H*h*) the resultant field lies as illustrated by lines 19 and 23 (FIGS. 3*c* and 3*d*).

Figure 4A:
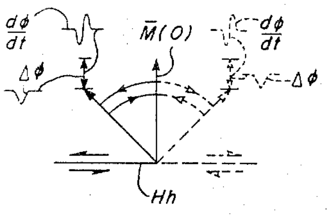
Figure 4B:
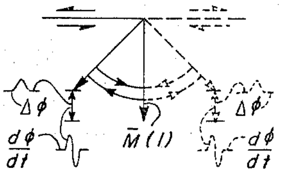

In the previous discussion, the explanation was concluded by describing the storing of binary digits "0" and "1" by writing at a digit position of the memory which writing is capable of changing the direction of magnetization along the easy axis (H*e*) by switching the state of magnetization to $\overline{M}(0)$ or $\overline{M}(1)$. In the present embodiment of the memory arrangement, it is desired to provide for a read operating cycle which includes a read unipolar pulse train R*u* producing a single applied (pulsed) transverse magnetic field along axis (H*h*) of such magnitude that it may project into the "creeping" zone 13 (FIG. 3*b*) of the magnetic thin film 18 but does not produce switching, and is still able to provide a nondestructive readout operation. It should be clear that the present invention is not limited to this mode of operation, i.e., partially destructive readout manner, even though the present embodiment provides for a write (restore) operation after each read operation in a read operating cycle. The present embodiment is capable of operating in a completely nondestructive readout manner (no "creeping") where the read unipolar pulse train R*u* is limited in amplitude so that the pulsed transverse magnetic field produced thereby does not enter into the "creeping" zone 13 of the magnetic thin film 18 to disturb the magnetization state $\overline{M}(0)$ or $\overline{M}(1)$ and writing back is completely unnecessary to maintain the binary magnetization state $\overline{M}(0)$ or $\overline{M}(1)$ (FIGS. 4*a* and 4*b*). Preferably, however, the present embodiment, as shown, provides for operating in a partially destructive readout manner wherein the read unipolar pulse train R*u* produces an applied transverse magnetic field which can extend into the "creeping" zone 13 of the magnetic thin film 18 of the rod 12*a* and each read operating cycle includes both a read operation and a write (restore) operation wherein the write (restore) operation provides for maintaining the desired magnitude of magnetization $\overline{M}(0)$ or $\overline{M}(1)$ after each read operation in order to tolerate or provide for "creeping" of the magnetization $\overline{M}$ as a result of an applied transverse magnetic field extending into the "creeping" zone during the read operation.

During any write operation, the magnitude of combined unidirectional and alternating magnetic fields produced by a write unipolar pulse train W*u* and write A.C. digit current W*a*1 is such as to extend beyond the critical curve for switching due to domain wall motion or a combination of domain wall motion and domain rotation. These combined magnetic fields during a write (restore) operation in a read operating cycle will maintain or restore, if necessary, the magnetization $\overline{M}(0)$ or $\overline{M}(1)$ if the magnitude of the magnetization has changed as a result of "creeping" while reading.

Summarizing the foregoing, a read operating cycle includes the sensing of the states of the thin magnetic film 18 at digit positions which comprise portions of the cylindrical magnetic thin film 18 in the areas of solenoid winding 14*a* by applying read unipolar pulse train R*u* to the solenoid winding 14*a* to produce a unidirectional magnetic field of short time duration along the hard axis (H*h*) which axis (H*h*) is transverse to the easy axis of magnetization. The transverse magnetic field produced by the read pulse train R*u* is substantially the same as the transverse magnetic field produced for the write unipolar pulse train W*u*, except for a time delay producing a phase shift of 90° (at the ten megacycle frequency (*f*)). The reason for the phase shift of the read pulses is to compensate for the phase shift produced in inducing sense signal S*t*1 in the rod conductor 16 at any digit position being read out.

Referring to FIGS. 4*a* and 4*b*, for a description of the production of typical sense signal trains S*t*1(1) and S*t*2(0) (FIGS. 8*g* and 8*h*) which are produced in response to a read unipolar pulse train R*u*, a unidirectional transverse magnetic field (H*h*) is produced by each pulse of the read unipolar pulse train R*u*. As a result, the magnetization $\overline{M}(0)$ or $\overline{M}(1)$ is shifted by each of these pulses as shown in FIGS. 4*a* and 4*b* to produce a change in magnetic flux ($\Delta\phi$) and a rate of change of flux $d\phi/dt$ which is detected by the rod conductor 16 to produce the sense signal train S*t*2(0) or S*t*1(1) as shown in FIGS. 8*h* and 8*g*, respectively. Each unipolar pulse of the train R*u* produces a change in flux ($\Delta\phi$) but the magnetization state $\overline{M}(0)$ or the magnetization state $\overline{M}(1)$ returns to the easy axis after each unipolar pulse of the train R*u*. Thus, the sense signal train S*t*1(1) (FIG. 8*g*) is produced in response to the read unipolar pulse train R*u* when a binary digit "1" is stored in the digit position being read out. This signal train S*t*1(1) has a predominant ten megacycle component and a phase of pi radians which is fed to the power parametric element M*b*1 (FIG. 6) that is operative to sense the signal S*t*1(1) to control the phase of parametric oscillations therein to be pi radians. The parametric element M*b*1 operates in this manner to detect and utilize the sense signal train S*t*1(1) during the read operation. At least a plurality of sense signals are required in each sense signal train S*t*2(0) or S*t*1(1) since the power parametric element M*b*1 builds up to the desired amplitude level (stable) only after a sufficient number of sense signals are produced to lock the parametric element M*b*1 in oscillation in the phase of pi radians for the digit "1" and the phase of zero radian for a digit "0." The dashed lines in FIGS. 4*a* and 4*b* indicate that alternate directions of rotation of $\overline{M}(0)$ or $\overline{M}(1)$ will occur depending upon the direction of the transverse magnetic field. As illustrated, the direction of the transverse magnetic field along the hard axis (H*h*) is immaterial.

In general, it is desirable for operating in a nondestructive readout manner to limit the magnitude of the transverse magnetic field below the threshold for "creeping." However, the complex nature of the "creeping" process is such that some "creeping" may occur after a sufficient number of read unipolar pulses in the train R*u* are applied, e.g., between three and twenty pulses to produce a sense signal train (e.g., S*t*1(1)) to control the power parametric element M*b*1 (FIG. 6) to produce parametric oscillations in the power phase of pi radians, for example. Furthermore, the cylindrical thin magnetic film having a circumferential easy axis (H*e*) has a number of important advantages over a cylindrical thin film having a longitudinal easy axis (H*e*) (not shown) in that the magnetization states $\overline{M}(0)$ or $\overline{M}(1)$ are retained inherently because of the closed circumferential magnetic path whereby stray de-magnetizing fields do not tend to change the state of magnetization as is often the effect if the easy axis (H*e*) of magnetization is longitudinal. Also, the cylindrical magnetic thin film 18 having the circumferential easy axis (H*e*) has a closed magnetic circuit in this direction which provides a number of important advantages over a thin magnetic thin film produced on flat plates. One advantage is that the cylindrical thin film is unaffected by stray magnetic fields such as the earth's magnetic field. Furthermore, the cylindrical thin film, because of its closed magnetic circuit, has much wider tolerances for thickness and length than a flat or planar magnetic thin film. Also, it has been shown that the signal output is independent of the diameter of the cylindrical thin film 18 and depends only upon the cross-sectional area and length of the magnetic film 18. Thus, the diameter of the rod 12*a* may be reduced to dimensions comparable with the thickness of the film 18 itself.

As to the unidirectional magnetic field in the transverse direction (along the hard axis (H*h*)) that is produced by the read and write unipolar pulse trains R*u* and W*u*, this feature of the present invention has considerable and important advantages over using alternating current for reading and writing. Referring to FIGS. 3*c* and 3*d*, the abstract diagrams shown therein demonstrate that the unidirectional transverse magnetic field represented by vector 21 in either FIG. 3*c* or 3*d* and produced by any one of the pulses in the train W*u* (FIG. 8*k*) does not cause the locus of points of the combined magnetic field (represented by the heavy lines) to cross over the critical curve except where lines 19 and 23 cross to produce the desired switching of magnetic state to store the binary digits "1" or "0" during writing. The pulses in the pulse train W*u* (FIG. 8*k*) are shaped (made narrow) and timed so that the applied magnetic fields represented by each of the heavy lines shown in FIGS. 3*c* and 3*d* (tracing the change in magnitudes of the combined magnetic fields) have only one crossing point on the respective one of the critical curves. Thus, the magnetization state $\overline{M}(0)$ or $\overline{M}(1)$ will not be repeatedly reversed during a write operation as may be the case if two alternating fields are utilized instead of a combination of a unipolar field and an A.C. field during a write operation. Another advantage of read and write unipolar pulses in trains R*u* and W*u* is that only one isolation diode 17 (FIG. 1) is required for each word in a simple linear selection circuit arrangement. Another important feature is demonstrated by the operation as illustrated in FIGS. 3*c* and 3*d*. As is clear from these diagrams, the crossing of the critical curve by the heavy lines 19 and 23 is precise and switching is instantaneous. Switching of the magnetization state of the thin film 18 at any selected digit position is accomplished by the first write pulse in the write train W*u* (FIG. 8*k*) and "creeping" to provide switching of the magnetization state is not required. This is important because "creeping" to provide switching of the magnetization state is slow and the slow speed is a serious limitation in fast access memory arrangements.

Figure 5:
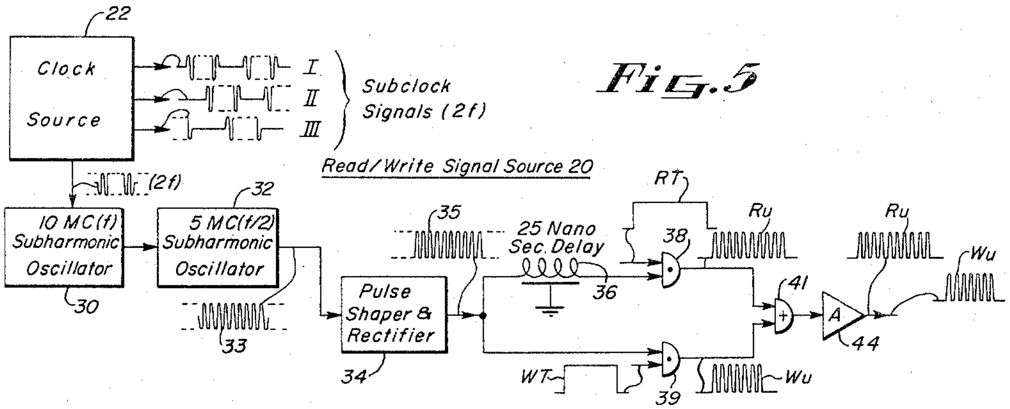
FIG. 5 is a schematic diagram of the read and write signal source and clock source shown in FIG. 1 which illustrates the manner in which the read and write signals are derived according to the preferred embodiment of the present invention.

*Read/write signal source* (*FIG. 5*)

The read/write signal source 20 has been provided to supply a read unipolar pulse train R*u* and a write unipolar pulse train W*u* (FIG. 10*b*) during each read operating cycle of the memory for readout and restoring the digits of any addressed word in the memory. For a write operating cycle of the memory, the source 20 supplies only a write unipolar pulse train W*u* during a portion of the time period of subclock II of the memory operating cycle. As shown in FIG. 5, the read and write unipolar pulse trains R*u* and W*u* are derived from a five megacycle A.C. signal 33 output of subharmonic oscillator 32, shaping and rectifying the five megacycle signal 33 to provide narrow unipolar pulses 35, and separately gating the shaped and rectified pulses by read-timing pulses RT and write-timing pulses WT. The five megacycle A.C. signal 33 supplied by the 5 mc. ($f/2$) subharmonic oscillator 32 is a subharmonic of the twenty megacycle sinusoidal signal ($2f$) generated by the clock source 22 which also supplies the subclock signals ($2f$) I, II and III as shown in FIG. 5. The twenty megacycle signal ($2f$) from the clock source 22 is coupled to the 10 mc. ($f$) subharmonic oscillator 30 to provide a ten megacycle signal ($f$) output which is applied to the 5 mc. ($f/2$) subharmonic oscillator 32. The five megacycle A.C. signal output of the oscillator 32 is coupled to the pulse shaper and rectifier 34 to produce narrow unipolar pulses 35 that are so timed that they will provide the magnetic vectors 21 and lines 19 and 23 shown in FIGS. 3*c* or 3*d* during each write operation for writing binary digits "0" or "1" respectively.

The unipolar pulses for the read operation are delayed 25 nanoseconds by the delay line 36 so that sense signals S*t*1(1) and S*t*2(0) generated during a read operation (FIGS. 8*g* and 8*h*) are in the proper phase relationship whereby the power parametric element M*b*1 (FIG. 6) will produce parametric oscillations of the proper phase in response thereto. The time delay of 25 nanoseconds is equivalent to a 90° phase shift at ten megacycles ($f$) which places the positive half of each sense signal S*t*1(1) (FIG. 8*g*) in phase to produce parametric oscillation in the phase of pi radians; and the negative half of each sense signal S*t*2(0) (FIG. 8*h*) in phase to produce parametric oscillation in the phase of zero radian. The delayed unipolar pulses are gated by the read-timing pulse RT in an AND gate 38 to produce read unipolar pulse train R*u* in each read operating cycle wherein the timing is illustrated by the waveforms in FIGS. 8*d* and 8*e*. Also, during each read operating cycle, unipolar pulses are gated by the write-timing pulse WT and passed by AND gate 39 to produce the pulse train W*u* as illustrated by the waveforms in FIGS. 8*j* and 8*k*. The read and write timing pulses RT and WT are supplied, for example, by "one-shot" multivibrators (not shown) triggered by differentiated leading and trailing edges of the clock pulse C (FIG. 8*a*), for example, in a conventional manner wherein the time duration of each of the timing pulses RT and WT is controllable as desired. Both the read and write timing pulse trains R*u* and W*u* are applied to the inputs of OR gate 41 having an output which is coupled to the amplifier 44. In accordance with the prior description of FIG. 1, the amplifier 44, if desired, has a transformer output (not shown) to provide a return from the emitter of the row transistors 29, and a "floating" voltage level for read and write unipolar pulse trains R*u* and W*u*.

The foregoing completes the description of the read/write signal source 20 (FIG. 5) for a read operating cycle. A write operating cycle is similar to a read operating cycle without a read operation. Accordingly, during a write operating cycle, only the write-timing pulse WT is applied to AND gate 39 simultaneously with the write A.C. digit current W*a*1 and no read-timing pulse RT is applied to AND gate 38. Typical timing and waveforms for a write operating cycle are shown in FIGS. 9*a* and 9*b*. By comparison of FIGS. 8*j* and 8*k* and FIGS. 9*a* and 9*b*, it is evident that the write operation, in a write operating cycle is the same as the write (restore) operation in a read operating cycle.

Figure 6:
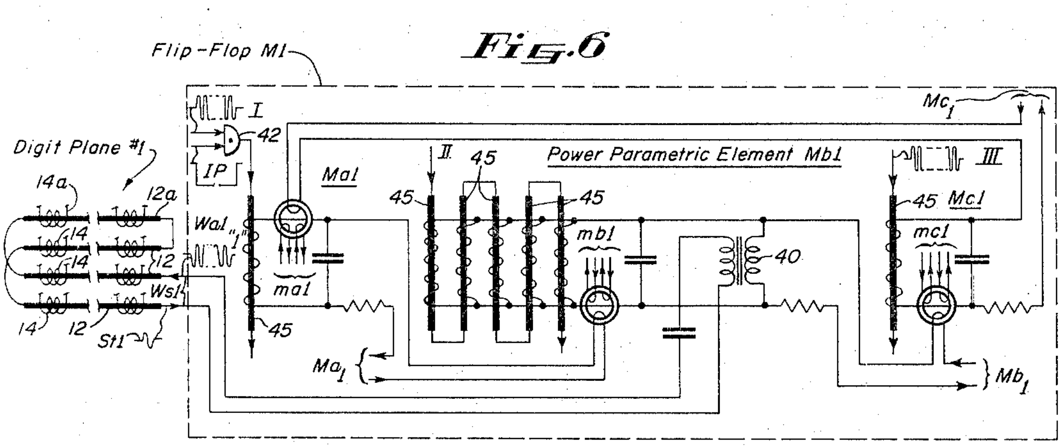
FIG. 6 is a circuit diagram of a typical flip-flop M1 of the memory input-output M Register shown in FIG. 1, according to the preferred embodiment of the present invention.

*Typical parametric flip-flop M1* (FIG. 6)

The details of a typical flip-flop M1 of the M Register (FIG. 1) are shown in FIG. 6 along with the memory digit plane #1 including four magnetic rods 12 and 12*a* and solenoid windings 14 and 14*a*. The digit plane #1 is connected to the flip-flop M1 at the sense-input write-output WS1 to receive the sense signal train S*t*1 for setting the flip-flop M1 in accordance with the binary signals ("1" or "0") read out of an addressed digit position of the memory digit plane #1, and to supply write A.C. digit current W*a*1 to write the binary signals ("1" or "0") stored in the flip-flop M1.

The parametric flip-flop M1 comprises three parametric elements M$a$1, M$b$1 and M$c$1. Each of these parametric elements operates in a conventional manner and the parametric flip-flop M1 operates in a conventional manner as disclosed in the cited copending application. The inputs for the parametric elements M$a$1, M$b$1 and M$c$1 are *ma*1, *mb*1 and *mc*1, respectively, and the outputs for parametric elements M$a$1, M$b$1 and M$c$1 are $Ma_1$, $Mb_1$, and $Mc_1$, respectively. Other flip-flops M2 to M4 have corresponding designations for inputs and outputs. In addition, the sense input and write output WS1 is provided for the power parametric element M$b$1 and as shown in FIG. 6, pulse transformer 40 is included to provide efficient coupling of the power parametric element M$b$1 to the magnetic rods 12 of the memory digit plane #1. Because of the efficiency of this pulse transformer 40, it has been found that the sense signal train S$t$1 will control the phase of parametric oscillation of the power parametric element M$b$1 even if another control "seed" signal is applied to the input *mb*1. However, to avoid the possibility of control signals being applied to input *mb*1 from parametric element M$a$1, the subclock I is not passed by AND gate 42 to the magnetic rod 45 of the parametric element M$a$1 during a read operating cycle. Accordingly, an inhibit pulse IP (FIG. 8*f*) is produced each read operating cycle to inhibit parametric oscillation therein and also to inhibit transfer of binary digits from parametric element M$a$1 to power parametric element M$b$1.

The power parametric element is similar to other parametric elements using only a single magnetic rod 45 and the additional magnetic rods 45 serve only to provide the additional power required to supply the write A.C. digit current (200 ma. for example) to the memory digit plane #1.

In FIG. 6, the details shown therein disclose an important advantage of the preferred memory arrangement of the present invention. It should be noted that the group of magnetic rods 12 in any one of the digit planes #1–#4 is connected in a closed loop to a transformer 40. Further, the easy axes of remanent magnetization of the respective magnetic rods 12 are circumferential. Thus, the applied magnetic fields produced by the write digit current in the magnetic rod conductors, are produced in opposite directions along the circumferential easy axis of the magnetic thin film to store respective binary digits "1" or "0." The sense signal train S$t$1 produced in the rod conductors during readout are produced in the closed loop formed by the group of magnetic rods 12 of any digit plane. This circuit arrangement of the memory provides for simplification of the memory array matrix including a common sense signal and write current closed loop line for each digit plane of the memory, and also, a common sense signal and write current circuit for each digit plane of the memory for sensing the sense signal outputs of the memory and producing the write currents for writing into the memory.

Figure 7:
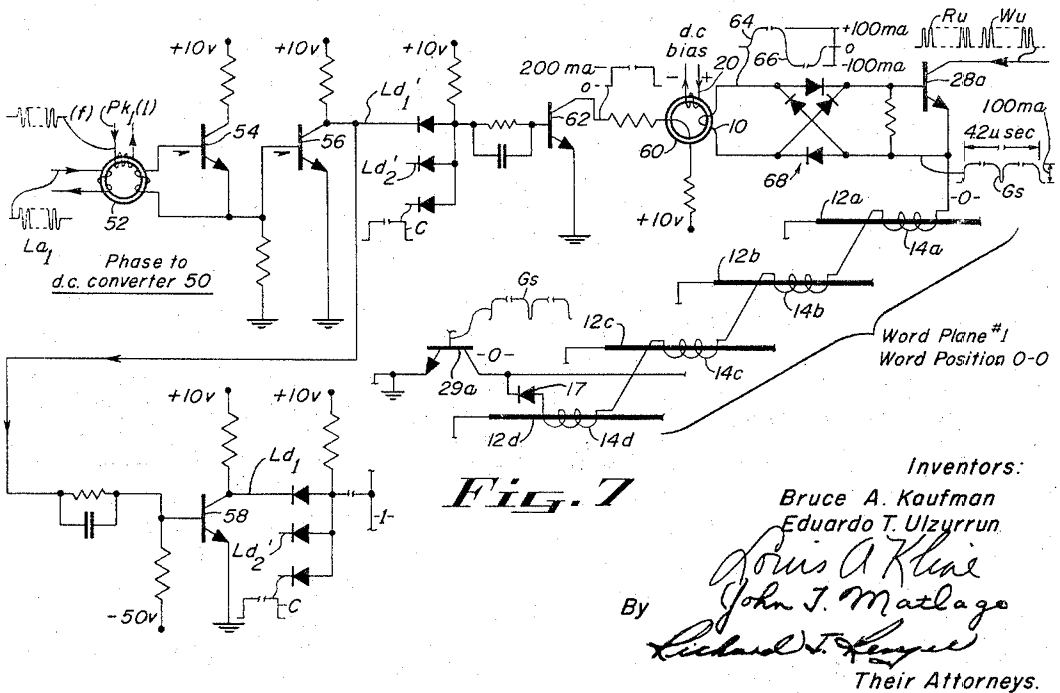
FIG. 7 is a circuit diagram showing the phase to D.C. converter output circuit of a typical memory address register flip-flop and a portion of the circuitry of the column decoding matrix and a word storage portion of the memory array shown in FIG. 1 according to the preferred embodiment of the invention.

*Typical address decoding circuit* (*FIG. 7*)

In the description of the preferred dual frequency memory arrangement of FIG. 1, it was noted that diode logic was preferred to parametric logic in the column and row address decoding matrices 24 and 26. Since the L Address Registers' flip-flops L1 to L4 are preferably parametric flip-flops, the outputs of these flip-flops have been converted from phase signals of zero or pi radians to suitable high "0" and low "1" level signals $Ld_1$ to $Ld_4$ by phase to D.C. converters as illustrated by the typical phase to D.C. converter 50 in FIG. 7 for the flip-flop L1. Flip-flop L1 includes a parametrical element L$a$1 (not shown) having an output $La_1$ (FIG 7) which is coupled to one of the inputs of the phase to D.C. converter 50. The other input $Pk_1$ (1) shown is the output of a constant parametric element (not shown) which always supplies a signal (*f*) of the phase pi radians in a known manner. Both signals $La_1$ and $Pk_1$ are coupled to the respective input windings of the toroidal core 52 having an output winding coupled between the base and emitter of NPN transistor 54. Because of the inherent circuit capacity between the base and emitter of transistor 54, no A.C. bypass capacitor is required and the D.C. output of transistor 54 is coupled via the emitter to the base of NPN transistor 56. The inverted D.C. signal current output from the collector, of transistor 56, is coupled to respective inputs of diode AND gates of the logical network as shown. The false output $Ld_1'$ is coupled directly to the diode network along with a similar false output $Ld_2'$ of the flip-flop L2 for the (column) word line –0–. The collector output of transistor 56 is coupled to the base of NPN transistor 58 where it is inverted to provide the true output $Ld_1$ of flip-flop L1 for the diode decoding network for selecting (column) word line –1– as shown.

The outputs of each diode decoding networks of the column and row decoding matrices 24 and 26 (FIG. 1) are coupled to pulse forming circuits to provide decoder output gating signals, e.g., G$s$, shown in FIGS. 6 and 10$a$. As shown in FIGS. 10$a$ and 10$b$, the timing of the gating signal G$s$ permits the passing of read unipolar pulse train R$u$ and write unipolar pulse train W$u$ to the selected column word line –0–, for example, which is connected to the emitter of transistor 28$a$. A similar gating G$s$ is supplied from the row decoding matrix to the selected row word line –0–, for example, which is connected to the collector of transistor 29$a$. According to the example illustrated in FIG. 6, the read and write unipolar pulse trains R$u$ and W$u$ are passed through the solenoid windings 14$a$ to 14$d$ at the word position 0–0 of the word plane #1 to read out and restore the binary digits in word position 0–0 in a single memory read operating cycle. The gating signal G$s$ is also produced during a memory write operating cycle to pass the write unipolar pulse train W$u$ to write the binary digits, stored in flip-flops M1 to M4, into the selected word position 0–0.

As shown in FIG. 7, the pulse forming circuit for providing the gating signal G$s$ comprises a ferrite switch core 60 having an input winding connected to the collector of an NPN transistor 62, a D.C. bias winding and an output winding. The pulse output on the collector of transistor 62 saturates the switch core 60 to produce a positive pulse 64 on the output winding and D.C. bias current returns the core 60 to its initial state to produce a negative pulse 66. The positive and negative pulses produced on the output winding of switch core 60 are passed by a full wave rectifier circuit 68 to produce the gating signal G$s$ which is applied across the base-emitter circuit of transistor 28$a$ to pass the read and/or write unipolar pulse trains R$u$ and W$u$ which are applied to the collector of transistor 28$a$ from the read/write signal source 20.

While the foregoing describes the preferred embodiment of the present invention as a dual frequency memory for sixteen words of four digits in each word (see FIG. 1), it should be realized that in practicing the invention a typical memory array, for example, may comprise twenty-six digit planes for a twenty-six bit word, sixteen magnetic rods 12 (each of which is 4.5 inches in length) for each digit plane, and thirty-two digit positions on each magnetic rod 12. Each word plane of this exemplary array includes thirty-two words, therefore, and the total storage capacity of an exemplary array comprises 512 words. Each of these exemplary memory arrays comprises a module and a memory arrangement comprises a number of modules having the desired storage capacity. Selection of any word in this memory is provided by simultaneous selection of any single module, and any row and any column of the selected module. Also, it should be noted that pulsed digit currents can be used instead of A.C. digit currents. Furthermore, the binary information can be sensed by the polarity of the sense signals rather than the phase of the sense signals, particularly if destructive readout is provided by higher amplitude read signals which destroy the magnetization state at the digit position being read out.

In the light of the above teachings, various modifications and variations of the present invention are contemplated and will be apparent to those skilled in the art without departing from the spirit and scope of the invention.

What is claimed is:

1. A dual frequency, thin film magnetic memory arrangement comprising:

an array of magnetic rods, each of said magnetic rods comprising a conductor having a circumferential anisotropic magnetic thin film thereon;

a plurality of solenoid windings wound on said magnetic rods to provide digit storage positions on said magnetic rods;

a source of unipolar pulses having a predetermined repetition rate for producing a series of said pulses each operating cycle of the memory and for providing at least one write unipolar pulse;

means for selectively applying said write unipolar pulse to any single one of said solenoid windings for applying a transverse unidirectional magnetic field to the magnetic thin film at said digit position in response to said write unipolar pulse;

at least one source of A.C. digit current having a frequency which is a higher harmonic frequency of said repetition rate of the unipolar pulses, said source providing an A.C. digit current having at least one phase or another phase to represent digital data; and circuit means coupling said source of A.C. digit current to said magnetic rods for applying a circumferential A.C. magnetic field to the magnetic thin film of the magnetic rods at said digit positions, said magnetic thin film at any selected one of said digit positions being responsive to coincidence of said unidirectional magnetic field and said A.C. magnetic field of one phase or the other phase to switch the magnetic thin film at said any selected one of said digit positions to store said digital data.

2. The dual frequency, thin film magnetic memory arrangement according to claim 1 in which at least a portion of said series of unipolar pulses are delayed to provide a read unipolar pulse train and said selection means applies said read pulse train to any single group of said solenoid windings comprising a word position to apply a corresponding train of transverse unidirectional magnetic fields to the magnetic thin film at the digit positions of the selected word position, said magnetic thin film at said digit positions being responsive to said train of transverse magnetic fields produced by said delayed read pulses to induce sense signals in respective conductors at said digit positions, said sense signals having a harmonic component which is in one phase or another phase for controlling the phase of the A.C. digit currents coupled to respective digit positions.

3. The dual frequency, thin film magnetic memory arrangement according to claim 1 in which said A.C. current comprises parametric oscillations and said source of A.C. current comprises a parametric element.

4. A dual frequency, thin film magnetic memory for storing and accessing digital data in memory operating cycles comprising:

a three-dimensional array of magnetic rods, each of said magnetic rods comprising a cylindrical conductor having a cylindrical anisotropic magnetic thin film surface thereon;

means for serially interconnecting magnetic rods in separate groups to provide digit planes;

a plurality of multi-turn solenoid windings wound about the thin film surface of each of said magnetic rods at spaced intervals thereon to provide digit storage positions in said memory for storing digital data and accessing said data;

a plurality of parametric flip-flops for storing binary digits according to the phase of parametrical oscillations, each of said flip-flops including a power parametric element coupled to the magnetic rod conductors of a respective digit plane for producing parametric oscillations including a write A.C. digit current and an A.C. magnetic field having phase information including one phase for the binary digit "1" and another phase for the binary digit "0" and producing parametrical oscillations in the same corresponding phases in response to sense signals induced in the magnetic rod conductors of the respective digit planes;

a source of read and write unipolar pulses for producing a train of write unipolar pulses each operating cycle of the memory and a train of delayed read unipolar pulses each operating cycle including a read operation;

and selective means for applying said unipolar pulse trains to any single group of solenoid windings comprising a word position for applying trains of transverse unidirectional magnetic fields to the thin film at digit positions of the selected word in response to said unipolar pulses, said magnetic thin film at said selected group of digit positions being responsive to the combined unidirectional magnetic field and A.C. magnetic field to store said binary digits and responsive to only said transverse magnetic field produced by said read pulse trains to produce sense signals in the magnetic rod conductors in each digit plane.

5. In a thin film magnetic memory, the combination comprising:

a plurality of serially connected magnetic rods comprising a digit plane each of said rods comprising an electrical conductor having a uniaxial anisotropic thin magnetic film on said conductor, said magnetic thin film having a circumferential easy axis of remanent magnetization forming a closed loop about said conductor to provide for magnetization states in either one direction or the opposite direction along said easy axis to magnetically store digital data;

means for applying a unidirectional magnetic field to any selected area of said thin film which magnetic field is transverse to said easy axis to produce a change in flux in either one direction or the opposite direction depending upon the direction of magnetization along said easy axis and also sense signals in said conductors; and means connected to said serially connected magnetic rods to complete a closed loop including said plurality of magnetic rods to detect said sense signals produced in response to said unidirectional magnetic field, said latter means further including storage means supplying at least a bipolar write current signal to said closed loop to produce corresponding first and second successive magnetic fields, said first and second magnetic fields being in opposite directions along said easy axis of the magnetic rods connected in said closed loop for magnetically storing each digit according to the direction of said second magnetic field produced by said bipolar write current signal.

6. In the thin film magnetic memory according to claim 5 in which the means for applying a unidirectional field comprises a plurality of solenoid windings and the combination of any one solenoid winding and the adjacent magnetic thin film comprises a digit position for storing digital data thereat.

7. In the thin film magnetic memory according to claim 6 in which linear selection circuit means are provided for selectively applying a unipolar pulse train to any single solenoid winding to read out the digital data stored in any selected digit position.

8. A dual frequency, thin film memory comprising:

a plurality of digit storage planes, each of said digit storage planes including a plurality of magnetic rods connected in series, each of said magnetic rods comprising a conductor having a circumferential anisotropic magnetic thin film thereon;

a plurality of windings wound about the thin film surface of said magnetic rods to provide digit positions in said memory for producing transverse magnetic fields at said digit positions;

a source of unipolar pulses producing at least one unipolar pulse in an operating cycle of the memory;

circuit means for serially interconnecting predetermined windings on magnetic rods in different digit planes for accessing a plurality of digit positions comprising a word storage position in each operating cycle of the memory;

selective means for applying said unipolar pulse to any selected serially interconnected windings for producing a transverse unidirectional magnetic field in the magnetic thin film in the areas of said selected serially interconnected windings in response to said unipolar pulse; and a plurality of digital storage elements each including means for receiving sense signals and suppling digital signals to said plurality of magnetic rods connected in series in a respective digit plane, said digital signals producing a circumferential magnetic field in the magnetic thin film of said magnetic rods and in one direction or the opposite direction to represent digital data, said magnetic thin film in the area of any selected winding responsive to respective coincident transverse unidirectional magnetic field and circumferential magnetic field in one direction or the other direction to switch the magnetic thin film in the area of the coincident fields to store said digital data at said digit position.

9. The dual frequency, magnetic thin film memory according to claim 8 in which the serial interconnections of the magnetic rods in each of the respective digit planes forms a closed loop and the magnetic rods are disposed and arranged to provide improved signal to noise ratio by balanced transposed and balanced non-transposed transmission lines in alternate digit planes for respective digital signals.

10. A magnetic thin film memory comprising:

a plurality of digital storage positions including a magnetic thin film having anisotropic characteristics including an easy axis of remanent magnetization providing magnetization states in either direction along said easy axis in order to store digital data;

circuit means for producing concurrent transverse magnetic fields at any selected one of said digital storage positions capable of storing a digit by controlling the direction of remanent magnetization at said selected storage position by said transverse fields, said circuit means including selective circuit means coupled to said magnetic thin film for selectively applying a unidirectional magnetic field to any one of a plurality of individual portions of said magnetic thin film forming a respective plurality of storage positions, said unidirectional magnetic field being in direction transverse to said easy axis to cause a rotation of the direction of magnetization of the selected portion of said thin film away from said easy axis; and said circuit means for producing concurrent transverse magnetic fields further including means coupled to said magnetic thin film for producing at least first and second magnetic fields of approximately the same magnitude sequentially in said thin film at said storage positions, said first magnetic field being in a first direction along said easy axis and said second magnetic field being in a second opposite direction along said easy axis and corresponding to the digit to be stored, said selected portions of said magnetic thin film being responsive to concurrent transverse magnetic fields including said unidirectional magnetic field and second magnetic field to cause the remanent state of magnetization at the selected portion of said magnetic thin film to be in the direction of said second magnetic field for storing said digit at the respective storage position.

11. The method of storing digital data at any selected one of a plurality of binary digit storage positions formed along a circumferentially continuous magnetic thin film on an electrical conductor, said thin film having anisotropic characteristics including an easy axis of remanent magnetization and a hard axis transverse to said easy axis, said method comprising:

generating a unipolar word current and bipolar digit currents concurrently including sequential digit currents of opposite polarities for storing a single binary digit at any selected storage position;

selectively applying said unipolar current to at least any selected one of said storage positions to produce a unidirectional magnetic field transverse to said easy axis to produce a rotation of the direction of magnetization of said thin film away from its easy axis and toward said hard axis at said selected storage position; and applying said bipolar digit current to said plurality of storage positions to produce at least a first magnetic field in either direction along said easy axis followed by a second magnetic field in the opposite direction from said first magnetic field and along said easy axis wherein the combination of said second magnetic field and said unidirectional magnetic field produce a combined magnetic field controlling the direction of magnetization along said easy axis for storing said digital data at said selected storage position.

12. The method of storing digital data in a magnetic thin film memory in a memory operating cycle comprising:

providing an anisotropic thin film having an easy axis of remanent magnetization including a plurality of digit storage positions disposed along individual portions thereof;

generating individual unipolar and bipolar currents concurrently in said memory operating cycle;

producing a unidirectional magnetic field in response to said unipolar current and selectively applying said magnetic field to any digit storage position of said magnetic thin film and in a direction transverse to said easy axis to rotate the direction of remanent magnetization from said easy axis; and producing first and second magnetic fields of approximately the same magnitude sequentially in response to said bipolar currents and applying said first and second magnetic fields to said magnetic thin film along said easy axis, said unidirectional magnetic field and said second magnetic field producing a combined magnetic field at said selected digit position which is capable of causing the direction of magnetization to be rotated to a state of remanent magnetization in the direction of said second magnetic field to store digital data.

13. The method in accordance with claim 12 in which either one of said first or second magnetic fields alone is insufficient to cause a reversal in the remanent magnetization state of the portions of said magnetic thin film at said digit positions and only the combination of said unidirectional and second magnetic fields is capable of reversing the direction of remanent state of magnetization at said selected digit position.

14. The method in accordance with claim 13 in which said storing of digital data is repeated in memory operating cycles and each said second magnetic field applied to any position of said magnetic thin film during storage of a series of digits in respective memory operating cycles is capable of causing a slight change in the remanent state of magnetization of any unselected portions of said thin film for said plurality of digit positions and said first magnetic field provides cumulative compensation for any slight changes in the remanent state caused by said second magnetic field to maintain the remanent state of magnetization of said unselected portions of said thin film substantially unaffected by said second magnetic field after storage of said series of digits at selected storage positions.

15. A magnetic data store arrangement comprising:

an array of magnetic storage elements in each of which a binary digit may be stored, each storage element comprising a cylindrical magnetic element of anisotropic magnetic thin film including a non-magnetic, electrically conducting, support rod and a solenoid winding which is wound around the cylindrical element, said storage element having a circumferential easy axis wherein a digit stored in the storage element is represented by the sense of the remanent magnetism of the magnetic element along the easy axis;

first means for applying a series of unidirectional current pulses including read and write pulses having a predetermined repetition frequency to said solenoid winding;

second means for applying an alternating digit current to said rod, the frequency of the digit current being a multiple of the repetition frequency of said unidirectional pulses and said digit current having one of two possible phases relative to said unidirectional pulses, said magnetic element being responsive to simultaneous application of at least one write current pulse and digit current to said solenoid winding and rod respectively to set the remanent magnetism of the magnetic element, the phase of the digit current determining the direction of remanent magnetization along said easy axis and the digit written into the storage element, wherein said digit is read out of the storage element by applying read current pulses to the solenoid winding inducing in the rod an alternating sense current which has one of two possible phases relative to the unidirectional current pulses, the phase of the sense current representing the digit read out and being determined by the sense of the remanent magnetism of the magnetic element of the storage element immediately prior to the application of said read pulses.

16. A data store arrangement according to claim 15 in which the write pulses are each of less time duration than one half-cycle of the alternating digit current.

17. A data store arrangement according to claim 15 in which said first means comprises a single source of unidirectional current pulses including said write pulses wherein said read pulses produced by said source are delayed.

References Cited

UNITED STATES PATENTS

| | | | |
|---|---|---|---|
| 3,060,411 | 10/1962 | Smith | 340—174 |
| 3,083,353 | 3/1963 | Bobeck | 340—174 |
| 3,311,899 | 3/1967 | Olsson et al. | 340—174 |

TERRELL W. FEARS, *Primary Examiner.*

BERNARD KONICK, STANLEY URYNOWICZ, *Examiners.*